Oct. 24, 1961 J. A. STROM 3,005,966

PRINTED CIRCUIT DELAY LINE

Filed June 17, 1960

INVENTOR.
JOHN A. STROM
BY Wade Koontz
ATTORNEY
Richard J. Killoren
AGENT

United States Patent Office 3,005,966
Patented Oct. 24, 1961

3,005,966

PRINTED CIRCUIT DELAY LINE

John A. Strom, Chelmsford, Mass., assignor to the United States of America as represented by the Secretary of the Air Force Filed June 17, 1960, Ser. No. 37,009
2 Claims. (Cl. 333—31)

This invention relates to a printed circuit skewed inductor for use as delay lines, transformers and other circuitry wherein coils are used.

Skewed turn inductances are used as delay devices in pulse circuitry. These have been made by first winding a coil on a form, removing the form and then flattening the unsupported coil to skew turns. Many difficulties are encountered in constructing such coils.

One object of this invention is to provide a skewed inductor which is much simpler to construct than prior art skewed inductors.

This and other objects will be more fully understood from the following detailed description taken with the drawing, wherein.

Figure 1:
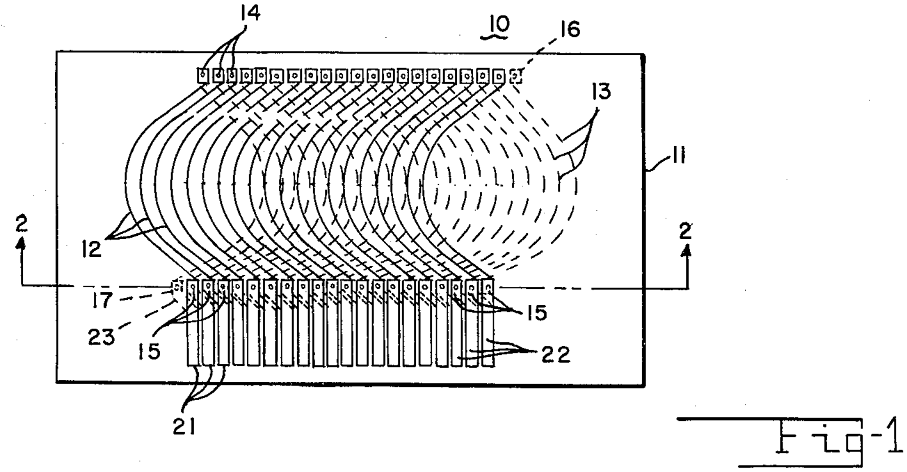
FIG. 1 is a schematic showing of a printed circuit skewed inductor, according to the invention, with capacitor elements connected in shunt with the turns of the coil.

Referring more particularly to FIG. 1 of the drawing, reference number 10 refers to a printed circuit skewed inductor having a support 11, which may be any dielectric material, upon which the turns 12 and 13 of the inductor are located. The turns 12, on the upper surface, are shown in full, and the turns 13 on the lower surface, are shown with dotted lines. The coil halves can be located on opposite sides of a single layer of dielectric material or may be located on separate layers of dielectric material which may be placed together to provide the support for the coil.

Figure 2:
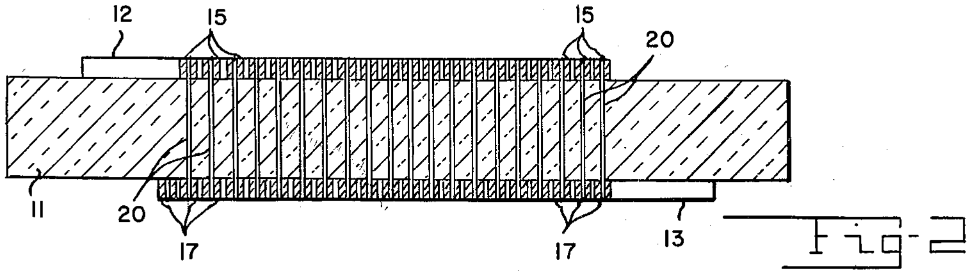
FIG. 2 is an enlarged sectional view of the device of FIG. 1 taken along the lines 2—2.
Figure 4:
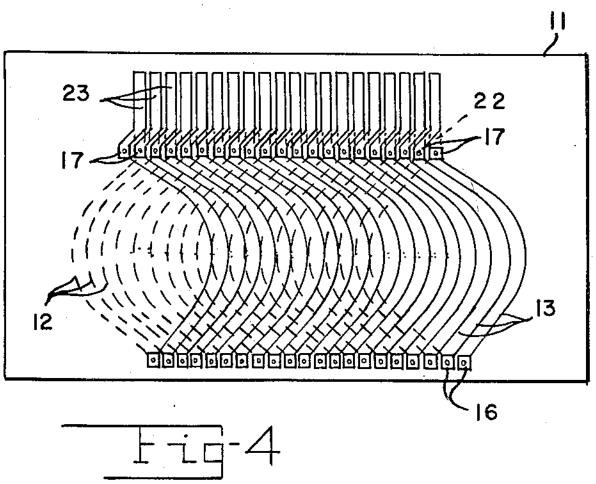
FIG. 4 shows a bottom view of the device of FIG. 1.
Figure 3:
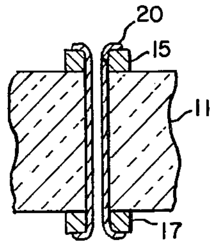
FIG. 3 shows one of the eyelets of FIG. 2.

Each coil half-turn has two terminals shown as 14 and 15 for the upper half turns and as 16 and 17 for the lower half turns. As shown in the drawing, terminals 14 are displaced one space with respect to terminals 15 so that by connecting terminals 14 to 16, and 15 to 17, a continuous coil is formed. The terminals 14 are connected to terminals 16 and terminals 15 are connected to terminals 17 by means of eyelets or by plated through connections as shown in FIGS. 2 and 3. In FIG. 3, an eyelet 20 is shown connecting a terminal 15 to a terminal 17 through the support 11.

As can be seen in FIGS. 1 and 2, the last terminal 16 on the right and last terminal 17 on the left are not connected to terminals on the other side of the support. These then provide the end terminals of the inductance coil.

Increased distributed capacitance may be provided by means of capacitance elements 21 printed alongside the coil on support 11. These capacitance elements may be connected between adjacent turns in the manner shown wherein upper plates 22 are connected to terminals 15 and the lower plates 23 are connected to the next adjacent terminal 17. Though these capacitance elements are shown as connected only to terminals 15 and 17, it is obvious that another set of capacitor elements could be provided on the other side of the coil where they would be connected to terminals 14 and 16. Also, it is obvious that capacitive elements may be connected across more than one turn, if desired.

Though various materials may be used in constructing the inductance coil of the invention, one coil which was constructed was made with commercially available copper clad glass laminate type GEE grade G10 by using standard printed circuit techniques. Interconnections between half-turns on either side of the support were made by using eyelets.

If it is desired to couple a plurality of coils together, several layers can be stacked and appropriately interconnected, also, metal laminates may be inserted between sections to increase the inductance. The supports may have various thicknesses and slide contactors may be used to provide variable inductors. To provide coils of various shapes, flexible laminates can be used.

There is thus provided a printed circuit skewed inductor for use as delay lines or other circuitry wherein coils are used.

While certain embodiments have been described, it is obvious that numerous changes may be made without departing from the principles and scope of the invention.

I claim:

1. A printed circuit skewed inductance coil, comprising, a dielectric support, a plurality of coil half turns of conductive material having one direction of curvature on one surface of said support, a plurality of coil half turns of conductive material having a direction of curvature opposite to said first direction of curvature on the other surface of said support, each of said coil half turns having two terminals, each of the coil half turns on one side of said support having one terminal directly opposite a terminal of a corresponding coil half turn on the other side of said support, all of said coil half turns except the end turns on said one side of said support having their other terminal directly opposite a terminal of a coil half turn adjacent said corresponding coil half turn on the other side of said support, conductive means for connecting all of the opposite terminals of said coil half turns together to thereby provide a continuous coil, a plurality of capacitance elements on said support adjacent said coil half turns, and means for connecting said capacitance elements in parallel with the turns of said inductance coil.

2. A printed circuit skewed inductance coil, comprising, a dielectric support, a plurality of coil half turns of conductive material having one direction of curvature on one surface of said support, a plurality of coil half turns of conductive material having a direction of curvature opposite to said first direction of curvature on the other surface of said support, each of said coil half turns having two terminals, each of the coil half turns on one side of said support having one terminal directly opposite a terminal of a corresponding coil half turn on the other side of said support, all of said coil half turns except the end turns on said one side of said support having their other terminal directly opposite a terminal of a coil half turn adjacent said corresponding coil half turn on the other side of said support, conductive means for connecting all of the opposite terminals of said coil half turns together to thereby provide a continuous coil, a plurality of capacitance elements having one plate adjacent the coil half turns on one side of said support and the other plate adjacent the coil half turns on the other side of said support, means for connecting the capacitor plates on one side of said support to one set of corresponding terminals of said coil half turns and means for connecting the capacitor plates on the other side of said support to the next adjacent corresponding terminals of said coil half turns.

References Cited in the file of this patent

UNITED STATES PATENTS

| | | |
|---|---|---|
| 2,512,945 | Kallmann | June 27, 1950 |
| 2,937,351 | Craig | May 17, 1960 |
| 2,943,277 | Lewis | June 28, 1960 |

FOREIGN PATENTS

| | | |
|---|---|---|
| 217,984 | Australia | Oct. 24, 1958 |